(12) United States Patent
Sasse

(10) Patent No.: US 6,540,053 B2
(45) Date of Patent: Apr. 1, 2003

(54) HYDRODYNAMIC CLUTCH DEVICE

(75) Inventor: Christoph Sasse, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/904,349

(22) Filed: Jul. 12, 2001

(65) Prior Publication Data

US 2002/0005324 A1 Jan. 17, 2002

(30) Foreign Application Priority Data

Jul. 12, 2000 (DE) .......................... 100 33 872

(51) Int. Cl.[7] .............................................. F16H 45/00
(52) U.S. Cl. ................................................ 192/3.29
(58) Field of Search ........................... 192/3.29, 3.3, 192/3.28

(56) References Cited

U.S. PATENT DOCUMENTS

| | | | | |
|---|---|---|---|---|
| 5,080,215 A | * | 1/1992 | Forster et al. ............... | 192/203 |
| 5,215,173 A | * | 6/1993 | Gimmler ..................... | 192/3.29 |
| 5,383,540 A | * | 1/1995 | MacDonald ................. | 192/201 |
| 5,575,363 A | | 11/1996 | Dehrmann et al. ........... | 192/3.3 |
| 6,290,041 B1 | * | 9/2001 | Bechmann et al. .......... | 192/3.29 |

* cited by examiner

*Primary Examiner*—Saúl Rodríguez
(74) *Attorney, Agent, or Firm*—Cohen, Pontani, Lieberman & Pavane

(57) ABSTRACT

A hydrodynamic clutch device, especially a hydrodynamic torque converter or fluid clutch, comprises a housing arrangement with a housing hub area, where a circumferentially extending fluid passage space is provided. This space is in fluid-exchange connection with a working fluid space in the housing arrangement and also in fluid-exchange connection or capable of being brought into such connection with a fluid passage opening provided in a power takeoff element. At least certain areas of the fluid passage space are divided into chambers arranged around the circumference.

15 Claims, 3 Drawing Sheets

HYDRODYNAMIC CLUTCH DEVICE

BACKGROUND OF THE INVENTION

1. Field of the Invention

The present invention pertains to a hydrodynamic clutch device, especially to a hydrodynamic torque converter or fluid clutch, comprising a housing arrangement with a housing hub area, in which a fluid passage space is provided, which space is in fluid-exchange connection with a working fluid space in the housing arrangement and which is also in fluid-exchange connection or can be brought into such connection with a fluid passage opening preferably provided in a power takeoff element.

2. Description of the Related Art

A hydrodynamic torque converter with a housing hub area designed in this way is known from U.S. Pat. No. 5,575,363. This known hydrodynamic torque converter 10', which is shown in FIG. 5, comprises a housing arrangement 12', which consists essentially of a en housing cover 14' and an impeller shell 16'. In its radially inner area, the impeller shell 16' is permanently connected by welding, for example, to an impeller hub 18'. The impeller shell 16' also carries a plurality of impeller vanes 20' proceeding in a row around the circumference and forms together with them and the impeller hub 18' an impeller wheel 22'.

In the interior space 24' of the hydrodynamic torque converter 10', furthermore, there is a turbine wheel 26'. This comprises a turbine wheel shell 28', which is permanently connected in its radially inner area to a turbine wheel hub 30' and which also carries a plurality of turbine wheel vanes 32'.

A stator 34', which carries a plurality of stator vanes 38' on an outer stator ring 36' and which is mounted by way of a freewheel unit 40' on a support element such as a hollow shaft 42' so that it is free to rotate in one direction around a rotational axis A but is prevented from rotating in the opposite direction, is provided axially between the turbine wheel 26' and the impeller wheel 22'. The hollow support shaft 42' is mounted concentrically inside the impeller wheel hub 18' and also surrounds concentrically a takeoff shaft 44', which constitutes the power-takeoff element. This shaft is or can be connected nonrotatably to the turbine wheel hub 30' by axially oriented sets of teeth and has a fluid passage opening 46' in its central area around rotational axis A, the opening passing axially through this area.

A bridging clutch arrangement 48' is also provided. This comprises a clutch piston 50', which, in the exemplary embodiment shown, is connected in essentially nonrotatable fashion to the housing cover 14' and thus to the housing arrangement 12'. The radially outer area of this piston can be pressed against the housing cover 14' by way of an intermediate friction lining disk 52'. The friction lining disk 52' is connected in essentially nonrotatable fashion by way of a carrier element 54' to the turbine wheel 26', that is, to the turbine wheel shell 28'.

It can be seen that the clutch piston 50' is connected by way of a flexible carrier arrangement 56' to an additional support element 58' in such a way that it cannot rotate but is free to move in the axial direction. The support element 58' is permanently attached to a housing hub, 60'. The clutch piston 50' is supported with freedom of axial displacement on an external circumferential area of the housing hub 60' by way of an intermediate sealing element 62'. The housing hub 60', the outer circumferential area of which is permanently connected to the housing cover 14' by welding, for example, also has a centering pin 64', which can be inserted into a corresponding centering opening in a drive shaft (not shown). The housing hub 60' has a plurality of fluid channels 66' passing through it, these channels extending approximately in the radial direction toward the outside. They connect a working fluid space 68' formed between the clutch piston 50' and the housing cover 14' with a fluid passage space 70', formed in the radially inside area of the housing hub 60' and essentially surrounded by it. Another working fluid space 72', which is formed essentially between the clutch piston 50' and the impeller wheel shell 16', and which also contains the turbine wheel 26', can be supplied with working fluid through, for example, a ring-shaped intermediate space 74' formed between the support element 42' and the takeoff shaft 44'. The working fluid space 68' is supplied with working fluid through the central fluid passage opening 46' of the takeoff shaft 44', the fluid passage space 70', and the fluid passage channels 66'. Of course, the working fluid can also be carried away from the working fluid spaces 68' and 72' through the same fluid flow routes just described. By the appropriate supply and removal of fluid, a fluid pressure can be built up on either axial side of the clutch piston 50'. In accordance with the pressure difference thus obtained, the clutch piston will then move toward the housing cover 14' to produce the bridging condition or away from it.

It can be seen that the fluid passage space 70', which ultimately is produced by the formation of an axial recess in the housing hub 60', which is made from a casting, for example, is sealed off on its axially open side in a fluid-tight manner with respect to the working fluid space 72' by a sealing element 76' installed between the turbine wheel hub 30' and the housing hub 60' and with respect to the space 74' by a sealing element 78', acting between the turbine wheel hub 30' and the takeoff shaft 44'.

In order produce the bridging condition in hydrodynamic torque converters of this type, it is therefore necessary to build up a positive pressure in the working fluid space 72'; that is, the clutch piston 50' must be displaced in the axial direction, and as this happens the working fluid present in the working fluid space 68' is forced radially inward against the action of the centrifugal force and thus passes through the fluid channels 66' and the fluid passage space 70'. From there it enters the fluid passage opening 46' and finally arrives in a collecting pan. Because the housing arrangement 12' and thus also the housing hub 60' rotate during this process, turbulence or vortices are produced by Coriolis forces in the working fluid emerging from the radially inner terminal areas 80' of the fluid channels 66'; this turbulence impedes the entry of the fluid into the fluid passage opening 46' and thus increases the flow resistance of the fluid.

SUMMARY OF THE INVENTION

It is the object of the present invention to improve a hydrodynamic torque converter of the general type in question so that it is possible with a low-cost design essentially to eliminate the impediment to the free flow of the fluid in the area of the housing hub arrangement caused by the flow conditions which develop during rotation.

This object is accomplished in accordance with the invention by a hydrodynamic clutch device, in particular a hydrodynamic torque converter or fluid clutch, comprising a housing arrangement with a housing hub area, where, in the housing hub area, a fluid passage space is provided, which is in fluid-exchange connection with a working fluid space in the housing arrangement, and which also is in or can be brought into fluid-exchange connection with a fluid passage opening preferably provided in a power takeoff element.

It is also provided that at least certain areas of the fluid passage opening are divided into chambers arranged around the circumference.

By subdividing the fluid passage area into several chambers arranged around the circumference, it is ensured that, especially while the assembly is rotating, the working fluid entering the fluid passage space enters the chambers and ultimately, by virtue of its presence in certain chambers, is carried along with the circumferential motion, because these chambers are obviously rotating along with the overall assembly. It is therefore impossible for any fluid turbulence to develop essentially unhindered around the rotational axis A, which turbulence could impede the entry of the fluid into the fluid passage opening of the takeoff element.

For example, a partition arrangement can be provided, by means of which the spaces are separated from each other at least in the circumferential direction. This partition arrangement or various wall sections thereof ultimately fulfill the function of vanes, which then carry along the fluid entering the various chamber areas as they rotate and thus prevent the development of turbulence.

The partition arrangement can consist, for example, of a single partition element, which is installed in the fluid passage space. This partition element, at least one of which is present, can be designed essentially in the form of a "U" with a connecting web area which is or can be positioned after the takeoff element in the axial direction, from which web area two essentially axial sidepiece sections proceed, which are designed to extend at least partially over the takeoff element in the axial direction. Ultimately to prevent the formation of turbulence or vortices around the rotational axis A until the fluid enters the fluid passage opening, a latching projection for axial engagement with the fluid passage opening of the takeoff element is provided on the connecting web area.

In the hydrodynamic clutch device according to the invention, the partition arrangement can be fixed in position on the housing hub area by a method such as caulking, welding (preferably resistance welding), or latching.

A connection of the partition arrangement to the housing hub arrangement which is very easy to produce and cheap to manufacture can be obtained by providing on the housing arrangement a plurality of fluid passage channels for establishing the fluid-exchange connection between the fluid passage space and the working fluid space and by providing the partition arrangement with at least one latching projection, which is or can be latched into one of the fluid passage channels to establish the latched connection.

To be able to provide the effect intended by the partition arrangement as effectively as possible, it is proposed that the partition arrangement rest essentially completely against an inside surface of the housing hub area which surrounds the fluid passage space.

A very low-cost design can be obtained by forming the partition element, at least one of which is provided, out of sheet metal, preferably out of spring sheet material.

The flow resistance in a hydrodynamic clutch device according to the invention can be minimized even more by providing a plurality of fluid passage channels in the housing arrangement for establishing the fluid-exchange connection between the fluid passage space and the working fluid space and by installing the partition arrangement in the housing hub area circumferentially between two fluid passage channels in each case, i.e., between the areas where the channels open out into the fluid passage space.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
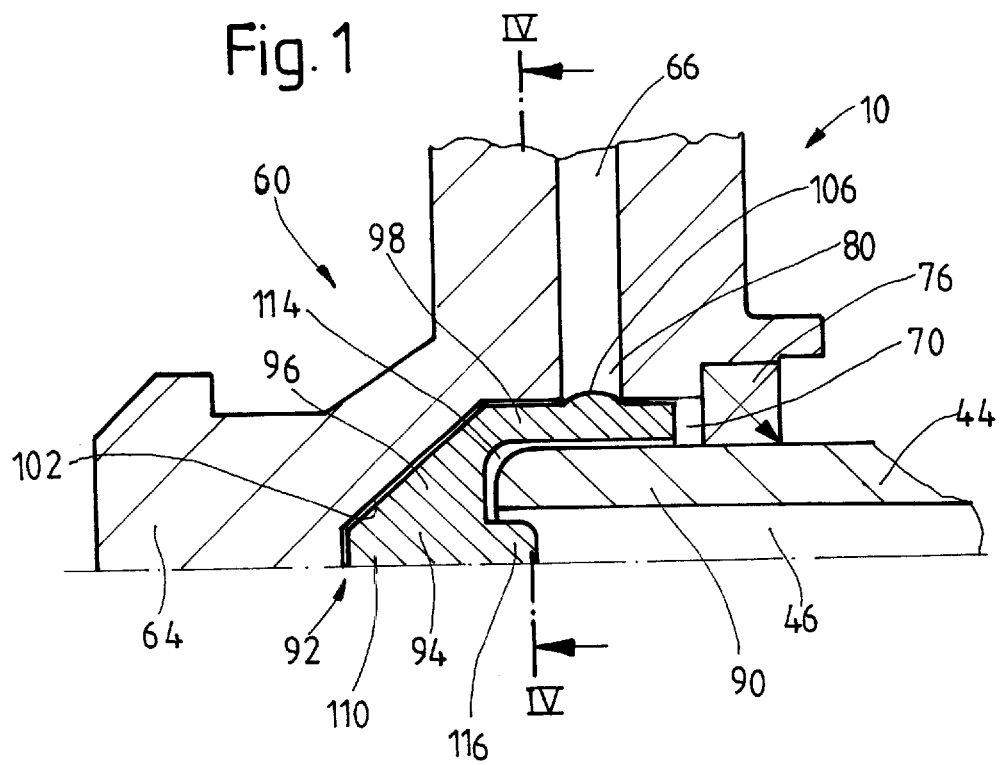
FIG. 1 shows a partial axial section view of a hydrodynamic torque converter according to the invention in the housing hub area.
Figure 5:
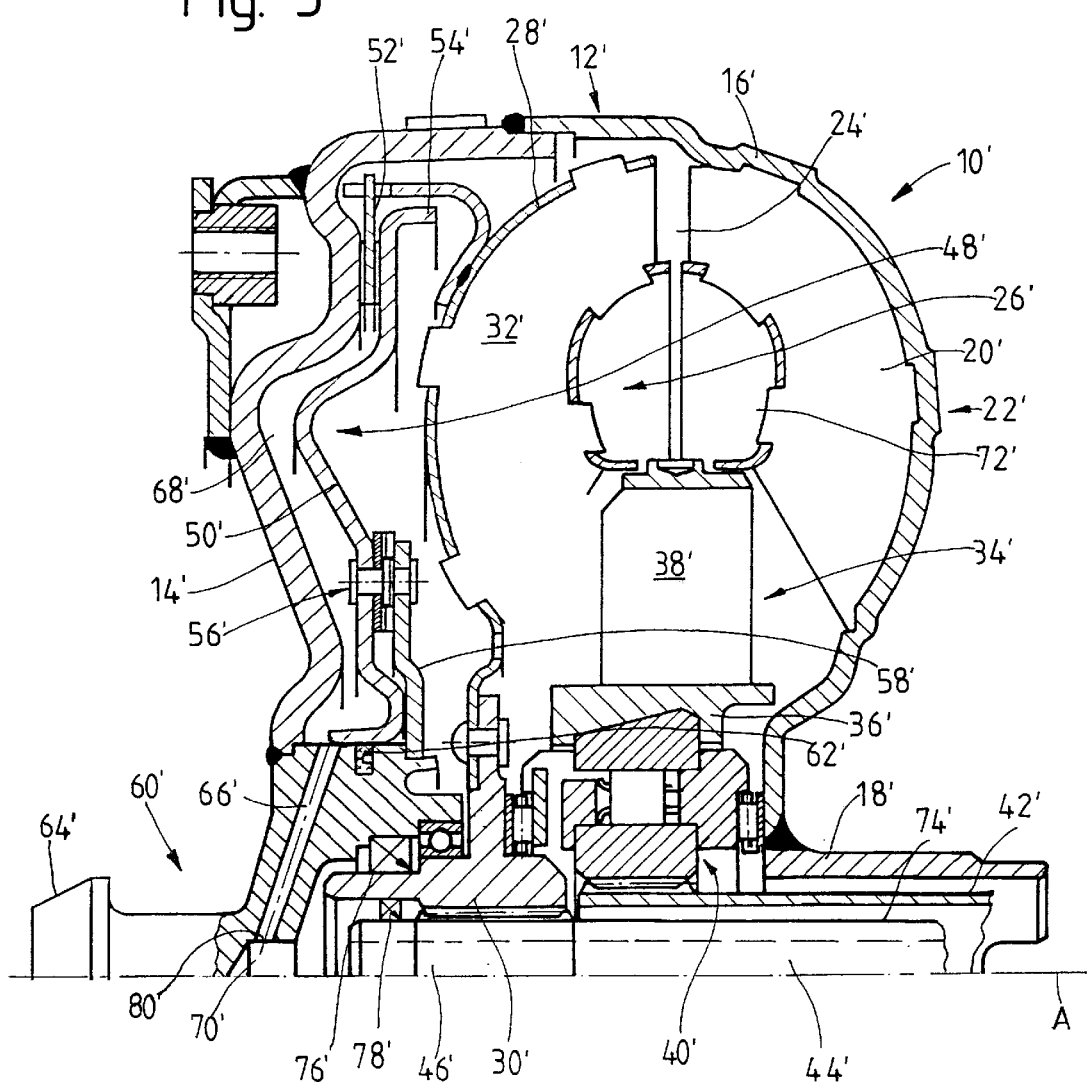
FIG. 5 shows a partial axial view of a hydrodynamic torque converter according to the state of the art.

FIG. 1 shows the radially inner area of the housing hub 60 of a hydrodynamic clutch device according to the invention, which can be, for example, a hydrodynamic torque converter 10. This torque converter can be designed as shown in FIG. 5 and as described above. In principle, the hydrodynamic torque converter according to the invention can obviously also be designed differently than this in various areas. Thus, for example, the clutch piston designated 50' in FIG. 5 could be connected for rotation in common not to the housing arrangement 12' but rather to the turbine wheel 26', in which case it would then, for example, press directly via a friction lining provided on it against the housing cover 14'. A torsional vibration damper could obviously also be installed in the path of torque transmission between the clutch piston 50' and the turbine wheel 26'. Thus only the basic design features of a hydrodynamic torque converter, as shown in FIG. 5, have been described above, there being no need to limit the invention to any specific design details.

The housing hub 60 has several radially inward-extending fluid passage channels 66 arranged around the circumference; the radially inside end area 80 of each of these channels opens out into the fluid passage space 70. The fluid passage space 70, as already discussed, is produced in the housing hub 60 by appropriate measures as part of a casting process, for example, followed by machining. The housing hub 60 could also be made out of sheet metal by appropriate shaping, and the centering pin 64 could then be attached to it by welding, for example. By the attachment of an additional component, furthermore, the fluid passage channels 66 could be formed by the cooperation between these two parts.

The sealing element 76, which ultimately could also serve as a bearing for the takeoff shaft 44, serves as a seal between the housing hub 60 and the takeoff shaft 44. The end 90 of the takeoff shaft 44 fits into the fluid passage space 70.

Figure 2:
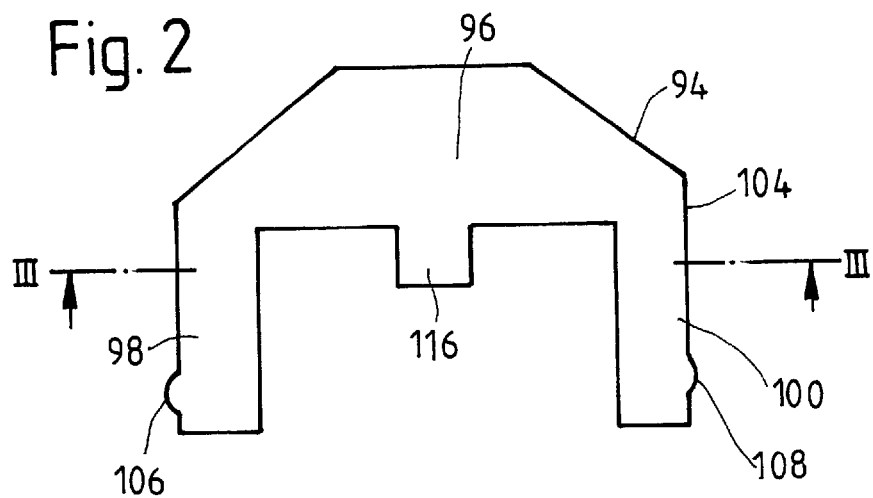
FIG. 2 shows a side view of a partition element.
Figure 3:
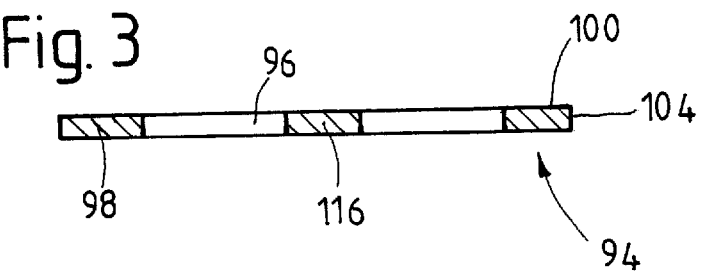
FIG. 3 shows a cross-sectional view of the partition element shown in FIG. 2 along line III—III of FIG. 2.

It can be seen that a partition element 94, representing essentially a partition arrangement 92, has been inserted into the fluid passage space 70. As can be seen in FIG. 2, the partition element 94 has an essentially U-shaped or E-shaped form with a connecting web 96 and two sidepiece areas 98, 100 projecting out from this web. The outside contour of the partition element 94 corresponds essentially to the contour or shape of an inside surface 102 of the housing hub 60, which inside surface 102 essentially surrounds the fluid passage space 70. Preferably a press-fit is provided so that, after the partition element 94 has been inserted into the fluid passage space 70, its outside peripheral edge 104, i.e., its outside peripheral corner, rests completely, that is, essentially continuously, against this inside surface 102.

Latching projections 106, 108 are formed on the two sidepiece sections 98, 100; when a partition element 94 is installed in the fluid passage space 70, these projections engage in or latch into their assigned fluid passage channels 66 in such a way that the partition element 94 is fixed in position in the housing hub 60.

Figure 4:
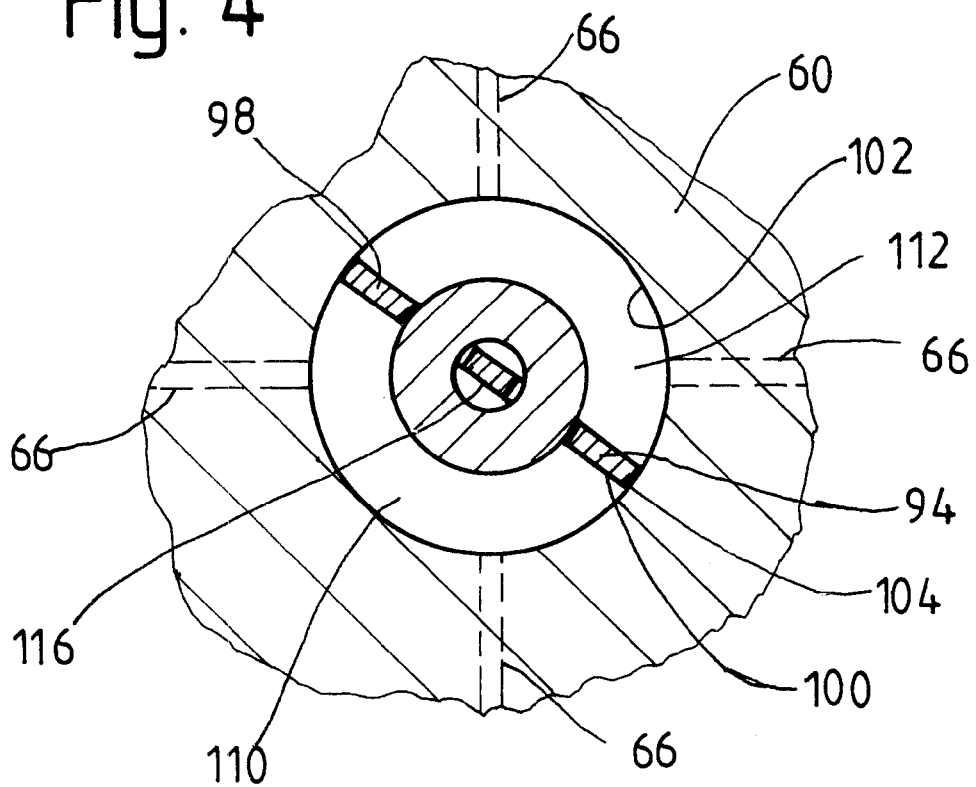
FIG. 4 shows a partial axial view of the housing hub area shown in FIG. 1 along line IV—IV of FIG. 1.

The partition element 94 divides the fluid passage space 70, that is, the space ultimately remaining between the housing hub 60 and the takeoff shaft 44, into two chamber areas 110, 112, as can be seen in FIG. 4. The two spaces 110, 112, into which the associated fluid channels 66 open, are arranged in sequence in the circumferential direction. Installing the partition element 94 has the effect of preventing the working fluid coming from the working fluid space 68' of FIG. 5 and entering the fluid passage space 70 via the fluid channels 66 from being accelerated in the circumferential direction with respect to the housing hub 60 and thus also with respect to the takeoff shaft 44 under the action of centrifugal or Coriolis forces to such an extent that the resulting vortices impede the entry of the fluid into the fluid passage opening 46. Instead, the partition element 94 carries the working fluid entering the various spaces 110, 112 along with it; it is impossible for any turbulence or vortices to develop around the rotational axis which would make it difficult for the working fluid to enter the passage opening 46.

Because the housing hub 60 and the takeoff shaft 44 are normally rotating at different speeds, especially in the unbridged state, a certain minimum intermediate space 114 must be provided between the takeoff shaft 44 and the partition element 94 to avoid mutual contact between these two elements. To avoid undesirable vortices or turbulence in the area of this intermediate space, the partition element 94 has an engaging projection 116 proceeding from its connecting web 96, which projection is of such a size that it can either fit at least slightly into the fluid passage opening 46, as can be seen in FIG. 1, or terminate just before the axial end of the takeoff shaft 44. The formation of vortices or turbulence in this axial intermediate space between the partition element 94 and the takeoff shaft 44 is thus also prevented.

The partition element 94 can be blanked out very easily and cheaply from sheet material, such as spring sheet, with a thickness of 0.5–5 mm and then latched into place in the housing hub 60 as described above. Some other method of fixing it in position can obviously also be selected. For example, the partition element 94 could be fastened to the housing hub 60 by resistance welding; it could also be bonded in place with an adhesive or fixed by caulking. The method shown in FIG. 1 is the simplest and cheapest to implement. If, however, an arrangement is to be provided such as that shown in FIG. 4, in which the partition element 94 is positioned in such a way that its sidepiece sections 98, 100 rest against the housing hub 60 in the areas between two fluid channels 66, then the latching system described above cannot be used. In this case, it is necessary to use one of the other method such as welding, caulking, adhesive bonding, etc. The arrangement shown in FIG. 4 has the advantage that no hindrance to the flow of fluid is produced in any of the fluid passage channels 66 by the latching areas engaging with them. Instead, the working fluid can passage all of the fluid passage channels 66 and enter essentially unhindered into one of the chambers 110, 112.

As a result of the design of the housing hub area of a hydrodynamic torque converter according to the invention, the development of undesirable turbulence in the working fluid flowing through the fluid passage space is prevented in an efficient and low-cost manner. The provision of several spaces separated at least partially from each other in the circumferential direction helps to carry the working fluid along in the manner of a turbine in a defined manner in the circumferential direction, thus allowing it to enter the fluid passage opening of the takeoff shaft without the development of any interfering turbulence. The same is also obviously true for the flow in the opposite direction. To make it even more difficult for such turbulence to occur, it would also be possible to divide the chamber into more than two separate areas, such as into four areas, by installing two of these partition elements, for example, at an angle of 90° to each other, which could ultimately be attached to each other by a plug-and-socket type of connection.

It should also be pointed out that, to suppress turbulence as effectively as possible, essentially the entire space formed between the housing hub 60 and the takeoff shaft 44 should be divided into chambers of this type, as indicated in FIG. 1.

Basically, however, it is not necessary to divide the area completely; different areas in the axial direction can be present in which this space is not divided into individual spaces, as can be seen, for example, in FIG. 1 by way of suggestion next to the axial end of sidepiece section 98.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A hydrodynamic clutch device comprising
a housing having a working fluid space,
a power take-off element having a fluid passage opening,
a housing hub located concentrically to said housing, said housing hub having a circumferentially extending fluid passage space in fluid-exchange connection with said working fluid space and with said fluid passage opening, and a plurality of fluid passage channels connecting said fluid passage space to said working fluid space in said housing, and
a partition arrangement for dividing said fluid passage space into circumferentially arranged chambers, said partition arrangement being installed in said fluid passage space circumferentially between said fluid passage channels.

2. A hydrodynamic clutch device as in claim 1 wherein said partition arrangement comprises at least one partition element arranged in said fluid passage space.

3. A hydrodynamic clutch device as in claim 2 wherein said at least one partition element is essentially U-shaped and comprises a diametrically arranged web extending across said fluid passage opening, and two sidepiece sections which extend axially over part of the take-off element.

4. A hydrodynamic clutch device as in claim 3 wherein said partition element further comprises an engaging projection located centrally on said web and extending axially into said fluid passage opening.

5. A hydrodynamic clutch device as in claim 1 wherein said partition arrangement is fixed in said housing hub by one of caulking, welding, and latching.

6. A hydrodynamic clutch device as in claim 1 wherein said partition arrangement comprises at least one latching projection which is latched into a respective at least one of said fluid passage channels.

7. A hydrodynamic clutch device as in claim 1 wherein said hub comprises an inside surface, said partition arrangement being fitted essentially flushly against said inside surface.

8. A hydrodynamic torque converter as in claim 2 wherein said at least one partition element is made out of spring sheet metal.

9. A hydrodynamic clutch device comprising a housing having a working fluid space, a power take-off element having a fluid passage opening, a housing hub located concentrically to said housing, said housing hub having a circumferentially extending fluid passage space in fluid-exchange connection with said working fluid space and with said fluid passage opening, and at least one partition element arranged in said fluid passage space for dividing said fluid passage space into circumferentially arranged chambers, wherein said at least one partition element is essentially U-shaped and comprises a diametrically arranged web extending across said fluid passage opening, and two sidepiece sections which extend axially over part of the take-off element.

10. A hydrodynamic clutch device as in claim 9 wherein said partition element farther comprises an engaging projection located centrally on said web and extending axially into said fluid passage opening.

11. A hydrodynamic clutch device as in claim 9 wherein said partition arrangement is fixed in said housing hub by one of caulking, welding, and latching.

12. A hydrodynamic clutch device as in claim 9 wherein said housing hub further comprises a plurality of fluid passage channels connecting said fluid passage space to said working fluid space in said housing, said at least one partition element comprising at least one latching projection which is latched into a respective at least one of said fluid passage channels.

13. A hydrodynamic clutch device as in claim 9 wherein said hub comprises an inside surface, said at least one partition element being fitted essentially flushly against said inside surface.

14. A hydrodynamic clutch device as in claim 9 wherein said at least one partition element is made out of spring sheet metal.

15. A hydrodynamic clutch device as in claim 9 wherein said housing hub further comprises a plurality of fluid passage channels connecting said fluid passage space to said working fluid space in said housing, said at least one partition element being in said fluid passage space circumferentially between said fluid passage channels.

* * * * *